(12) United States Patent
Scheidt et al.

(10) Patent No.: US 7,016,495 B2
(45) Date of Patent: *Mar. 21, 2006

(54) MULTIPLE LEVEL ACCESS SYSTEM

(75) Inventors: Edward M. Scheidt, McLean, VA (US); Ersin Domangue, Woodbine, MD (US)

(73) Assignee: Tecsec, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/870,250

(22) Filed: Jun. 16, 2004

(65) Prior Publication Data

US 2004/0254882 A1  Dec. 16, 2004

Related U.S. Application Data

(62) Division of application No. 10/060,011, filed on Jan. 30, 2002, now Pat. No. 6,754,820.

(60) Provisional application No. 60/264,715, filed on Jan. 30, 2001.

(51) Int. Cl.
*H04L 9/00* (2006.01)
*G06F 17/60* (2006.01)

(52) U.S. Cl. .................... 380/45; 380/44; 380/277; 380/259; 705/71; 713/171

(58) Field of Classification Search .......... 713/166, 713/168, 169, 184, 187, 201, 202, 171; 380/44, 380/277, 259; 705/71
See application file for complete search history.

(56) References Cited

U.S. PATENT DOCUMENTS

| | | | |
|---|---|---|---|
| 5,280,527 A | 1/1994 | Gullman et al. | |
| 5,495,533 A | 2/1996 | Linehan et al. | |
| 5,499,297 A * | 3/1996 | Boebert | 713/159 |
| 5,694,472 A * | 12/1997 | Johnson et al. | 713/189 |
| 6,011,847 A | 1/2000 | Follendore, III | |
| 6,219,790 B1 | 4/2001 | Lloyd et al. | |
| 6,317,834 B1 | 11/2001 | Gennaro et al. | |
| 6,490,680 B1 | 12/2002 | Scheidt et al. | |
| 6,532,542 B1 | 3/2003 | Thomlinson et al. | |
| 6,754,820 B1 * | 6/2004 | Scheidt et al. | 713/166 |

OTHER PUBLICATIONS

Dalton, Strongly Auth. and Encrypted Multi-level Access to CMW Sys. over Insecure Networks using the SSH Protocol, HP Labs Bristol, Feb. 1999, pp. 1-17, HPL-98-99(R.1).
Smith, Multi-Level Security, http://www.smat.us/crypto/mis/, Aug. 9, 2002, pp. 1-2.

* cited by examiner

*Primary Examiner*—James Trammell
*Assistant Examiner*—Charlie C. Agwumezie
(74) *Attorney, Agent, or Firm*—IP Strategies (57) ABSTRACT

A method of securing an object at an access level includes selecting a profile for a user, including a credential having an encrypted credential public key, an encrypted credential public key encryption key, and a multiple-level access identifier. A working key is generated by binding a domain value with a random value. The object is encrypted with the working key. A random value encryption key is generated based on the shared value by decrypting the credential public key encryption key with the profile key encryption key, decrypting the credential public key with the credential public key encryption key, generating an ephemeral key pair, and generating a shared value based on the ephemeral private key and the credential public key. The random value is encrypted with the random value encryption key, and the encrypted object, the ephemeral public key, and the encrypted random value are provided for an authorized recipient.

5 Claims, 8 Drawing Sheets

| Number | Decrypt | Encrypt | Number | Decrypt | Encrypt | Number | Decrypt | Encrypt |
|--------|---------|---------|--------|---------|---------|--------|---------|---------|
| 1 | – | – | 4 | ↑ | – | 7 | ↓ | – |
| 2 | – | ↑ | 5 | ↑ | ↑ | 8 | ↓ | ↑ |
| 3 | – | ↓ | 6 | ↑ | ↓ | 9 | ↓ | ↓ |

| Access Type | Set of Available Credentials |
|---|---|
| 1 | $\{(\forall c \in P \ni \exists x_c \in c \land \lambda_c = \lambda_{IA}) \cup (\forall c \in P \ni \exists y_c \in c \land \lambda_c = \lambda_{IA})\}$ |
| 2 | $\{(\forall c \in P \ni \exists x_c \in c \land \lambda_c = \lambda_{IA}) \cup (\forall c \in P \ni \exists y_c \in c \land \lambda_c \geq \lambda_{IA})\}$ |
| 3 | $\{(\forall c \in P \ni \exists x_c \in c \land \lambda_c = \lambda_{IA}) \cup (\forall c \in P \ni \exists y_c \in c \land \lambda_c \leq \lambda_{IA})\}$ |
| 4 | $\{(\forall c \in P \ni \exists x_c \in c \land \lambda_c \geq \lambda_{IA}) \cup (\forall c \in P \ni \exists y_c \in c \land \lambda_c = \lambda_{IA})\}$ |
| 5 | $\{(\forall c \in P \ni \exists x_c \in c \land \lambda_c \geq \lambda_{IA}) \cup (\forall c \in P \ni \exists y_c \in c \land \lambda_c \geq \lambda_{IA})\}$ |
| 6 | $\{(\forall c \in P \ni \exists x_c \in c \land \lambda_c \geq \lambda_{IA}) \cup (\forall c \in P \ni \exists y_c \in c \land \lambda_c \leq \lambda_{IA})\}$ |
| 7 | $\{(\forall c \in P \ni \exists x_c \in c \land \lambda_c \leq \lambda_{IA}) \cup (\forall c \in P \ni \exists y_c \in c \land \lambda_c = \lambda_{IA})\}$ |
| 8 | $\{(\forall c \in P \ni \exists x_c \in c \land \lambda_c \leq \lambda_{IA}) \cup (\forall c \in P \ni \exists y_c \in c \land \lambda_c \geq \lambda_{IA})\}$ |
| 9 | $\{(\forall c \in P \ni \exists x_c \in c \land \lambda_c \leq \lambda_{IA}) \cup (\forall c \in P \ni \exists y_c \in c \land \lambda_c \leq \lambda_{IA})\}$ |

Fig. 5

| Access Type | $Xek_c$ | $yek_c$ | Independent Read Value | Independent Write Value |
|---|---|---|---|---|
| 1 | $xek_c = \kappa_\lambda$ | $yek_c = \kappa_\lambda$ | N/A | N/A |
| 2 | $xek_c = \kappa_\lambda$ | $yek_c = (H^{(\lambda c - 1)}(yek_1)) / 2^{(h-k)}$ | N/A | $yek_1$ |
| 3 | $xek_c = \kappa_\lambda$ | $yek_c = H^{(s - \lambda c)}(yek_s) / 2^{(h-k)}$ | N/A | $Yek_s$ |
| 4 | $xek_c = (H^{(\lambda c - 1)}(xek_1)) / 2^{(h-k)}$ | $yek_c = \kappa_\lambda$ | $xek_1$ | N/A |
| 5 | $xek_c = (H^{(\lambda c - 1)}(xek_1)) / 2^{(h-k)}$ | $yek_c = (H^{(\lambda c - 1)}(yek_1)) / 2^{(h-k)}$ | $xek_1$ | $yek_1$ |
| 6 | $xek_c = (H^{(\lambda c - 1)}(xek_1)) / 2^{(h-k)}$ | $yek_c = H^{(s - \lambda c)}(yek_s) / 2^{(h-k)}$ | $xek_1$ | $yek_s$ |
| 7 | $xek_c = H^{(s - \lambda c)}(xek_s) / 2^{(h-k)}$ | $yek_c = \kappa_\lambda$ | $xek_s$ | N/A |
| 8 | $xek_c = H^{(s - \lambda c)}(xek_s) / 2^{(h-k)}$ | $Yek_c = (H^{(\lambda c - 1)}(yek_1)) / 2^{(h-k)}$ | $xek_s$ | $yek_1$ |
| 9 | $xek_c = H^{(s - \lambda c)}(xek_s) / 2^{(h-k)}$ | $xek_c = H^{(s - \lambda c)}(xek_s) / 2^{(h-k)}$ | $xek_s$ | $yek_s$ |

Fig. 6

Profile Encryption

| Encrypted Profile Encryption Keys | Encrypted Credential Private and Public Key Encryption Keys |
|---|---|
| $ePEK_1 = e(PEK, \kappa_1)$<br>$ePEK_2 = e(PEK, \kappa_1)$<br>.<br>.<br>.<br>$ePEK_{\lambda max} = e(PEK, \kappa_{\lambda max})$ | $exek_1 = e(xek_1, \kappa_1) \quad eyek_1 = e(yek_1, \kappa_1)$<br>$exek_2 = e(xek_2, \kappa_2) \quad eyek_2 = e(yek_2, \kappa_2)$<br>.<br>.<br>.<br>$exek_{\lambda max} = e(xek_{\lambda max}, \kappa_{\lambda max}) \quad eyek_{\lambda max} = e(yek_{\lambda max}, \kappa_{\lambda max})$ |
| Encrypted Profile | Encrypted Credential Private and Public Keys |
| $eProfile = e(Profile, PEK)$ | $ex_1 = e(x_1, xek_{\lambda(1)}) \quad ey_1 = e(y_1, yek_{\lambda(1)})$<br>$ex_2 = e(x_2, xek_{\lambda(2)}) \quad ey_2 = e(y_2, yek_{\lambda(2)})$<br>.<br>.<br>.<br>$ex_n = e(x_n, xek_{\lambda(n)}) \quad ey_n = e(y_n, yek_{\lambda(n)})$ |

MULTIPLE LEVEL ACCESS SYSTEM

CROSS-REFERENCE TO RELATED APPLICATIONS

This is a divisional of U.S. patent application Ser. No. 10/060,011, which was filed on Jan. 30, 2002 now U.S. Pat. No. 6,754,820, and is related to U.S. Provisional Patent Application Ser. No. 60/264,715, filed on Jan. 30, 2001, co-pending U.S. patent application Ser. No. 09/023,672, filed on Feb. 13, 1998, co-pending U.S. patent application Ser. No. 09/418,806, filed on Oct. 15, 1999, and co-pending U.S. patent application Ser. No. 10/060,039, filed on Jan. 30, 2002. The disclosures of all the related applications are incorporated herein in their entireties.

FIELD OF THE INVENTION

Generally, the present invention relates to techniques for controlling access to computer-based systems. In particular, the present invention relates to techniques for providing multiple-level access control to objects in a computer system.

BACKGROUND OF THE INVENTION

Access control can be defined as enforcing data-use or other object-use permissions that grant or deny access to content or applications. In this context, data-use can include a broad selection of functions such as reading, changing, executing, creating, overwriting, or deleting. The ability to change access permissions is another type of access that can be granted or denied.

Access control should be considered in a system approach in which a strong user (entity or member) identification and authorization (I&A) process-plays a role. An exemplary system for user identification is described in a co-pending U.S. patent application, Ser. No. 10/060,039, filed on Jan. 30, 2002, the entire disclosure of which is incorporated herein by this reference.

Thus, the goal is to provide access control to objects such as data and applications. It should be flexible and suitable for implementing a variety of different schemes, such as discretionary access controls (DAC) and mandatory access controls (MAC). The key management system should be suitable for implementing a role-based access control system (RBAC). These controls should support content-based access control architectures that provide a very granular object level enforcement or that enable an expanded access.

BRIEF SUMMARY OF THE INVENTION

It is therefore an objective of the present invention to enforce domain member access control to CKM labeled data with cryptography—i.e. by using symmetric key algorithms, asymmetric key algorithms and cryptographic hash functions.

It is another objective of the present invention to enforce domain member access control to applications.

It is an additional objective of the present invention to control encryption (write) and decryption (read) of objects based on the content of the object.

It is also an objective of the present invention to allow credential application to restrict or broaden readership of labeled objects.

It is another objective of the present invention to provide a user interface paradigm that is intuitive and easy to use.

It is an additional objective of the present invention to provide sensitivity level or multiple-level access control such that access to credentials is dependant on the method of member identification.

It is also an objective of the present invention to enforce domain authority-dictated policies for multiple-level access control by credential category.

According to an exemplary aspect of the invention, a user's profile ("user profile") determines whether and how the user can encrypt (write) and decrypt (access) an object, which can be, for example, a data instance or a computer program. A user profile includes at least one credential, and each credential includes one or both of an asymmetric key pair: a credential public key (write authority) and a credential private key (access authority).

A user can encrypt (or write) an object with one or more particular credential public keys included in the user's profile, such that subsequent decryption of the encrypted object by another 1 s user (or the original user) requires corresponding or otherwise authorized credentials. Accordingly, a user can decrypt an encrypted object if the user possesses, in that user's profile, credentials corresponding to those with which the encrypted object was encrypted. A user can select one or more credentials with which to interact with a particular object or objects in general, or selection of credentials can be automated.

A credential and an object can correspond to a multiple-level access level ("MLA level") to effectuate a partitioned-access scheme, an access-up scheme, or an access-down scheme for encryption and decryption of objects. The MLA level of a credential can be assigned by a domain authority, whereas the MLA level of an object can be assigned based on the object's content or based on the credential(s) used to encrypt the object.

A user profile and one or more credentials included in the profile can be secured, in whole or in part, through one or more levels of encryption. Thus, a user can obtain access to the user's respective user profile and one or more particular credentials contained in the profile by providing the requisite data for respective decryption of the profile or the credentials. The requisite data can be encryption scheme data (such as one or more encryption keys, algorithm identifiers, key qualifiers, or algorithm qualifiers, for example) or instances of keying data used to generate encryption scheme data. Further, a user can provide the requisite data as required by or during an identification protocol through which the user obtains access to the computer system. In either case, the requisite data can be preexisting or generated, in whole or in part, such as through a user identification and authorization scheme.

Access controls according to the present invention are enforced using cryptographic algorithms, either proprietary or standards-based. Basic read and write access is correlated to decrypt and encrypt access, respectively, through credentials. These credentials can also define different access sensitivity levels based on defined I&A. Credentials can also control access to applications.

The present invention extends enforcement through read and write access controls, using cryptography, whereas most systems, such as computer operating systems, use software to provide access enforcement. The system of the present invention can be used alone, or with operating system access controls to provide greater security. For example, the present invention can provide cryptographic enforcement of a computer file system read and write controls.

These models offer a flexible approach to I&A and can allow the domain authority to tailor I&A policies for a particular domain. The present invention can be viewed as defining different I&A schemes with different relative assurance levels that can be used within a single domain.

According to a particular aspect of the present invention, in a multi-level access system, a method of securing an object at a multiple-level access level includes receiving, from a user, a profile key encryption key corresponding to the multiple-level access level, selecting an object to secure, and selecting a profile associated with the user. The profile includes a domain value, an encrypted profile encryption key, and a credential. The credential includes an encrypted credential public key, an encrypted credential public key encryption key, and a multiple-level access identifier. The method also includes selecting the credential based on a comparison of the multiple-level access level and the multiple-level access identifier, and generating a working key. Generating the working key includes generating a random value, and binding at least the domain value and the random value together to form the working key. The method also includes encrypting the object with the working key, and generating a random value encryption key. Generating the random value encryption key includes decrypting the encrypted credential public key encryption key with at least the profile key encryption key, decrypting the encrypted credential public key with at least the decrypted credential public key encryption key, generating an ephemeral key pair including an ephemeral private key and an ephemeral public key, generating a shared value based on at least the ephemeral private key and the decrypted credential public key, and generating the random value encryption key based on at least the shared value. The method also includes encrypting the random value with at least the random value encryption key, and providing the encrypted object, the ephemeral public key, and the encrypted random value for an authorized recipient. The profile can also include a profile initialization vector, in which case decrypting the encrypted credential public key encryption key can also include decrypting the encrypted credential public key encryption key with the profile key encryption key and the profile initialization vector. The credential can also include a credential initialization vector, in which case decrypting the encrypted credential public key can include decrypting the encrypted credential public key with the decrypted credential public key encryption key and the credential initialization vector. The multiple-level access level can correspond to the multiple-level access identifier, or the multiple-level access level can be identical to the multiple-level access identifier, lower than the multiple-level access identifier, or higher than the multiple-level access identifier.

BRIEF DESCRIPTION OF THE DRAWINGS FIGURES

FIG. 5 is a table showing an exemplary set of credentials that are available for a given log-in MLA level and defined access type.

DETAILED DESCRIPTION OF THE PRESENT FIGURES

Generally, according to the present invention, a computer system includes a user profile for each user of the system. A user profile is used to determine whether and how the user can encrypt (write) and decrypt (access) an object, which can be, for example, a data instance or a computer program.

A user profile includes at least one credential, and each credential includes one or both of an asymmetric key pair: a credential public key (write authority), and a credential private key (access authority). The use of a particular credential can be write-only, access-only, or write and access authorized.

A user can write (or secure) a preexisting object, which might be unsecured or already secured, or a new object created by the user, such as an electronic communication. A user secures an object by accessing at least one credential included in the user's user profile, and encrypting the object with the respective public key of each of the at least one accessed credential, such that subsequent access to the secured object requires access to corresponding or otherwise authorized credentials.

A user can access a secured object if the user possesses credentials corresponding to those with which the secured object was encrypted.

A credential or an object can have a respective MLA level associated with it. A user can secure an object at one or more respective access levels with one or more accessed credentials, such that subsequent access to the secured object requires access to corresponding or qualified credentials. Access levels can correspond to a partitioned access scheme, an access up scheme, or an access up scheme in regards to encryption and decryption. Different schemes can be selected for write and read control.

A user can control the access level available to the user by selecting one or more of the user's credentials either at the time an object is to be encrypted or decrypted, or during implementation of an identification protocol through which the user obtains access to the computer system.

A user profile and one or more credentials contained in the user profile can be secured, in whole or in part, through one or more levels of encryption. Thus, a user can obtain access to the user's respective user profile and one or more particular credentials included in the profile by providing the requisite data for respective decryption of the profile or the credentials. The requisite data can be encryption scheme data (such as one or more encryption keys, algorithm identifiers, key qualifiers, or algorithm qualifiers) or instances of keying data used to generate encryption scheme data. Further, a user can provide the requisite data as required or during an identification protocol implementation through which the user obtains access to the computer system. In either case, the requisite data can be preexisting or generated, in whole or in part, such as through a combining or binding procedure.

In constructing an object encryption key (or session key), the paradigm of the present invention includes a random value. The random value is encrypted using the public part of an asymmetric key pair. To reconstruct the object encryption key, the random value must first be decrypted using the corresponding private part of the asymmetric key pair. Enforcement through read and write access control is based on sharing the private and public keys, respectively. The key pairs are directly correlated to credentials that are associated with labels or information content. By using more than one key pair to encrypt and decrypt the random value, access can be restricted or broadened.

Asymmetric Key Credentials

A credential is a key pair used for access control. The public key is called the write credential and the private key the read credential.

A credential or set of credentials can define a role. In the system of the present invention, domain members can be assigned to one or more roles and have access rights that correspond to the credentials within that role. Applying a credential during encryption under this system can be referred to as labeling.

The application of the scheme of the present invention is embodied in the labeling of an object. When a credential is applied, the public key associated with that credential is used in the encryption process. The private key associated with that same credential must be available in order to be able to decrypt the object. Possession of public and private keys is the basis of read and write access control in the system of the present invention.

Credentials that Restrict Access

A single credential can be used during a session, and simultaneous use of more than one credential is also allowed. A user is required to have read access to all of the credentials that were used for session encryption before decryption is possible. This means that adding credentials during encryption has the effect of restricting readership within the domain.

Credentials can be grouped into categories for ease of use. Generally, within a category, credentials will be related. An example of a category is "country". Credentials in this category might include "U.S.", "Canada", "Germany", "England", and so on. Selecting "U.S." from the country category as a credential during encryption would limit readership of the encrypted object to those who have read access to the "U.S." credential. Another example of a category is "security level". Credentials found in this category could be "Top Secret", "Secret", "Confidential", or "Sensitive But Unclassified". Thus, selecting "Secret" from the security level category as a credential during encryption would limit readership of the encrypted object to those who have read access to the "Secret" credential.

Given that credentials within a category are related, applying multiple credentials by selecting one credential from each category during encryption is contemplated. For example, selecting "Secret" from the security level category, and "U.S." from the country category would limit readership even more as only those who have both the "U.S." and the "Secret" credential could decrypt the object. This is an example of adding credentials that restrict readership.

Note that credentials within a category can be mutually exclusive, as for example, the country category above where each credential can be taken without reference to a role or member's association. However, credentials can also be inclusive, such as those in the security level category, in which it can be defined that credentials to a particular security level can include credentials to all security levels lower than that level. The partitioning of the "Top Secret", "Secret", and "Confidential" read and write access would depend on assigning these credentials to identified roles that are associated with the members.

Credentials that Broaden Access

The system architecture gains more flexibility if credentials are allowed to broaden readership in addition to restricting readership. Broadening access can be managed by allowing multiple credentials within a particular category to be chosen. In this case, a member would be required to have read access for only one of the credentials that were used for encryption within that category. This is known as "either-or" capability, because either of the credentials is required for decryption.

Referring back to the previous example, choosing both the "Canada" and the "U.S." credentials from within the country category will allow users with either read access for "Canada" or read access for "U.S.", the ability to decrypt. Adding credentials by selecting more than one credential within a category broadens readership.

There is a danger that for categories that have inclusive type credentials, it is possible for a member to misuse this access broadening mechanism. For example, it defeats the purpose to label data as both "Top Secret" and "Confidential". In this case, credentials should be bound to the I&A process to differentiate a member's access rights.

Credentials that Have Different Sensitivity

Different user identification factors can be used alone or together according to the present invention to create different I&A schemes, such as that defined in the co-pending I&A patent application cited previously. More than one scheme can be defined within a domain. Security levels, risk assessment levels, or assurance levels may be related to different schemes. These schemes are assigned a Multi-Level Access (MLA) level. A domain member can have a choice of which I&A scheme to use for login depending on the assigned relative security level.

Credentials are assigned to an MLA level. Whether the use of a particular credential is permitted depends on the MLA level of the I&A scheme that was used for login.

For a login of a given security level, three possibilities exist for read access and for write access—only those credentials at the same level as the login are accessible, those at the same level and up are accessible, or those at the same level and down are accessible. The first type of access is called partitioned access, the second type access up, and the last access down. Combinations of all access types result in nine different ways to handle multi-level read and write access. The choice of access type will depend on the domain environment and domain policy.

Figure 1:
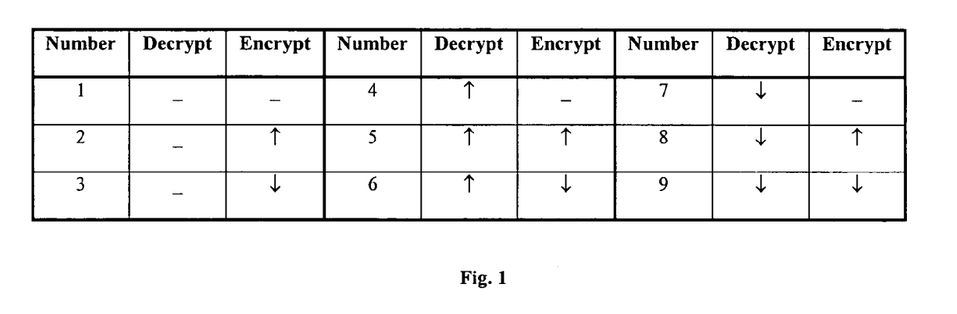
FIG. 1 is a table showing a summary of combinations of read and write permissions.

In FIG. 1, the symbol, —, represents permission to use credentials only at the same level as I&A, ↑ represents permission to use credentials at the same level as I&A or above, and ↓ represents permission to use credentials at the same level as I&A or below.

As an illustration, consider the Bell-LaPadula model, which is used within the military environment. This corresponds to combination 8 in FIG. 1 and can be summarized as "read-down/write-up". Translated for the present invention, this means that credentials at or above the current login level can be used for encryption, and data that has been encrypted with credentials at or below the current login level can be decrypted. Using the examples from above, logging in at the lowest level would enable the member to encrypt using all of the credentials in the security level category for encryption. However, only data encrypted using credentials at the lowest level, say "Confidential", can be decrypted. Logging in at the highest level would enable the member to encrypt data using "Top Secret" only, but would allow decryption of data that used any of the credentials within the security level category.

A domain can selectively apply an MLA level to a category. In the previous example, MLA was applied to the "security level" category, whereas the "country" category was not subject to MLA.

Access Control Through Symmetric Key Algorithms

The symmetric key cryptographic algorithms that are used for object encryption can be used to control access. The ability of a member to use a specific algorithm can be allocated to roles as another factor enforcing access control. The selection of algorithms can be defined by the domain.

For example, members who are in the U.S. might have all algorithms including AES with all key sizes while those in England might have 128-bit AES or use a proprietary algorithm. Other countries might use DES, while others might use 40-bit RC2. The selection of available algorithms can be defined through national policy.

The symmetric algorithm access process can be complemented with MLA. The algorithms available to a member would also then depend on the security level of the member login process. The combination of algorithm access and MLA offers a more balanced security approach. Data that is more sensitive requires stronger algorithms together with stronger user I&A.

Access to Applications

Access to applications and associated credentials can also be controlled. Each application, along with the list of credentials that are valid for each application, is assigned to a member. The application credentials will be contained in the member's profile that is defined, for example, through the runtime environment of the key management system. Only the credentials that appear in the list can be used with the application. The I&A process validates a member to his or her profile for further decryption of the profile. After the profile is decrypted, the application-credentials are available for accessing prescribed applications. The key management runtime environment protocol, for example, enforces the access to an application.

Additional integrity can be included in the application-credential process. The application's file (or an element of the file) and the list of associated credentials can be digitally signed by the domain authority. To access an application, a member must have the digital signature in his or her profile, as well as at least one of the credentials associated with the application. When the application starts, the key management runtime environment requests the signature from the member's profile. If there is no signature, the application is not accessed. If the signature is available, it will be verified against the application file and the list of credentials associated with that application. If the signature verifies correctly, access is granted. The runtime environment will only allow the member to use the set of credentials that the domain authority has associated with the application.

Implementation

Credentials Available

Different I&A methods correspond to different MLA levels depending on the domain policy. The result of a successful login is a value that is used as a symmetric cryptographic key.

Each credential has an MLA level associated with it. When MLA is used, then the credentials that are available will depend on the level of the I&A scheme used to login. MLA levels are represented by the number 0, and by integers starting from 1. A credential assigned to level 0 is special; this signifies that the credential is exempt from MLA. Beginning with level 1, higher levels can represent different levels of security, for example, stronger security. MLA exemption will be in effect for all credentials within a given category, that is, individual credentials, while flagged with level 0, are not individually given MLA exemption—only categories are. Those credentials in the categories that are exempt from MLA (as determined by the domain authority) are always available.

For credentials in categories that are subject to MLA, access is granted if the credential MLA level corresponds to the I&A level. This is true whether partitioned access, access up, or access down is specified.

For encryption, if write-up is specified by the domain authority, then the public keys for all credentials with MLA level greater than the I&A level will also be available. If write-down is specified, then the public keys for levels below the I&A level will be available for encryption.

Similarly for decryption, if read-up is specified, then private keys for credentials with MLA level greater than the I&A level will be available. If read-down is specified, then private keys for credentials with MLA level below the I&A level will be available.

Profile Encryption

Encryption of credentials within a member's profile is the basis for enforcing multiple level access. Credential private and public keys are encrypted with a key corresponding to the MLA level assigned to the credential. These credential encryption keys (CEKs)—the credential private key encryption keys and credential public key encryption keys—appear in the profile as ciphertext. The encryption key for each CEK is derived from the I&A value of the corresponding level.

Any suitable proprietary or standard symmetric key algorithm can be used for profile encryption. For example, triple DES (3×DES) is a current standard symmetric key algorithm suitable for profile encryption. A replacement algorithm for 3×DES known as the Advanced Encryption Algorithm (AES) will soon be an official standard. AES in eight bit cipher feedback (CFB8) mode can be used to encrypt the member's profile. The profile encryption key (PEK) is 128 bits for the key plus 128 bits for an initialization vector (IV), for a total of 256 bits. The IV used for the profile is a random string that is stored as plaintext within the profile. The key portion of the PEK is encrypted using the I&A derived value as the basis for the profile key encryption key (PKEK). If more than one level of I&A is used, such as with MLA, then there will be more than one PKEK. CFB8 mode is presented as an exemplary key algorithm, so that each item in the profile can be encrypted without regard for padding issues.

To implement read-up or read-down, the credential private key encryption keys are related to each other. Similarly, to implement write-up or write-down, the credential public key encryption keys are related to each other. The relationships are defined below. There four types of credential access: MLA exempt credential access, partitioned access, access up, and access down.

MLA Exempt Credentials: If the credential is exempt from MLA, then the credential encrypting keys and initialization vector are the same as the profile encrypting key and IV.

Partitioned Access: For partitioned access, the credential encrypting key is just the value derived from the I&A process of the corresponding level.

Access Up: For access up, the credential encryption key for the lowest level is generated at random. Credential encryption keys at other levels are derived from this first key in such a way that key values of levels above any level can be derived but key values of the levels below cannot. For example, a one-way hash function (OWHF) such as SHA256 is used.

Access Down: For access down, the credential encryption key for the highest level is generated. Credential encryption keys at lower levels are derived from this key in such a way that key values of levels below some given level can be derived but key values of levels above cannot. For example, a OWHF such as SHA256 is used.

Random Value Encryption Key Generation

There are two random values associated with the key management process of the present invention: a random value that is used in the construction of a working key, and an ephemeral key pair that is used in the encryption and decryption of the first random value.

A combiner, or binder, is the function that produces a working key, that is, the key used for object encryption. An exemplary combiner is described in U.S. patent application Ser. No. 09/023,672. The combiner takes three key inputs: a domain value, a domain maintenance value, and a random value. Domain and maintenance values are included in a member's profile but the random value must be sent or kept with the encrypted object. The random value changes with the creation of a new working key. Credentials that are chosen for use in the encryption process are used to encrypt this random value. The encryption of the random value with a key derived from the chosen credentials is the basis of assigning access permissions and enforcing access control to encrypted objects.

Each instance of an object encryption results in a new random value and Diffie-Hellmen ephemeral key pair generation. For encryption, the ephemeral private key is used with each chosen credential public key to compute shared values. The ephemeral public key is sent with the encrypted object for use during decryption. For decryption, the ephemeral public key will be used with each credential private key to recreate the shared values. From these shared values, a random value encryption key (REK) is calculated.

Restricting Access Credentials

To use credentials that only restrict access, the REK is built from all of the shared values. This requires possession of all of the credential private keys (read permissions) in a member's profile for decryption. To manage this effectively, credentials are partitioned into categories and the user interface will only allow one credential to be chosen per category.

The REK is produced from the shared values by binding using, for example, the combiner noted above, to generate a key from shared values. AES in ECB mode can be used, for example, to encrypt the random value, in which case 128 bits of key are needed. Using this exemplary algorithm would mean that the basic method of generating the REK is to concatenate the shared values, a counter value, which is the string value $00000001_{16}$, and some "other" information, which in this case can be the credential indices, concatenated in order. This value is then hashed using SHA256 and the most significant 128 bits from this hashed value is used for the REK. See FIG. 2.

Figure 2:
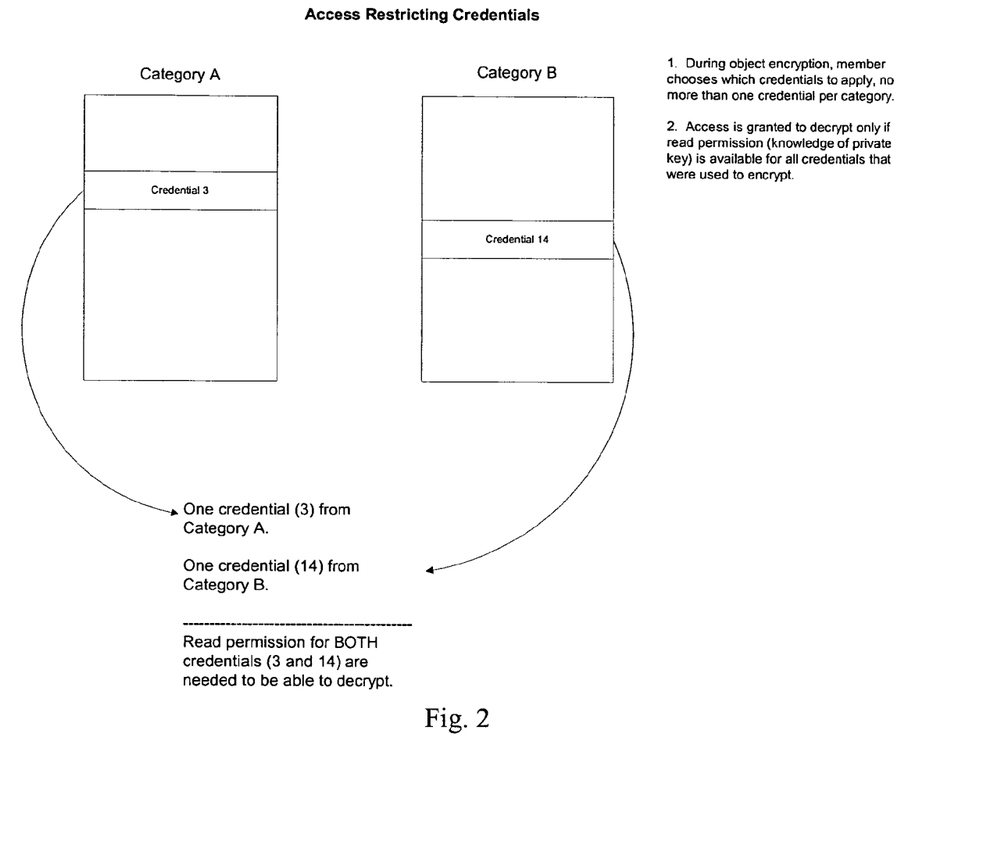
FIG. 2 is a block diagram illustrating the selection of credentials to restrict access according to an exemplary embodiment of the present invention.

As shown in the figure, during object encryption, a member chooses which credentials to apply. In this example, no more than one credential per category can be chosen. As shown, Credential 3 is selected from Category A, and Credential 14 is selected from Category B. Thus, read permissions for both credentials are required to be able to decrypt the encrypted object. That is, access is granted to decrypt only if read permission (knowledge of private keys) is available for all credentials that were used to encrypt.

Broadening Access Credentials

For credentials that broaden access, a different implementation is used. The user interface will allow multiple credentials within a category to be selected. This is interpreted as the requirement to have read access to at least one of the chosen credentials in each category to enable decryption. A category for which this applies is called a multiple credential selection category (MCSC). See FIG. 3.

Figure 3:
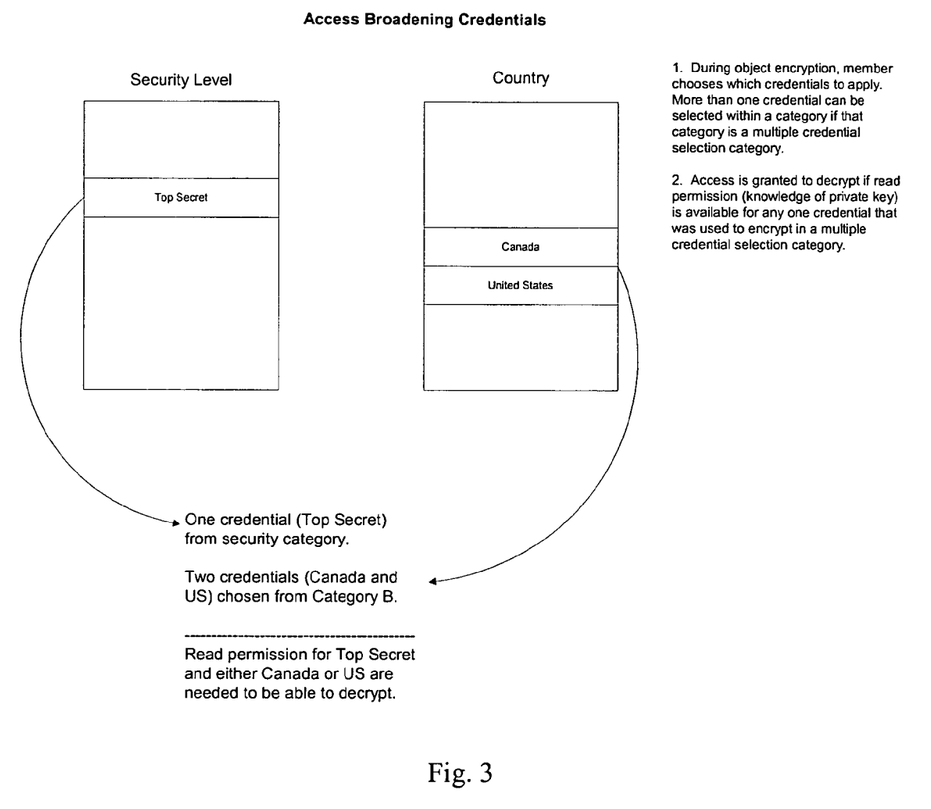
FIG. 3 is a block diagram illustrating the selection of credentials to broaden access according to an exemplary embodiment of the present invention.

As shown in the figure, during object encryption, a member selects which credentials to apply. More than one credential can be selected form within a category if that category is a MCSC. In the example shown, one credential (Top Secret) is selected from the Security Level category, and two credentials (Canada and United States) are selected from the Country category. Thus, read permissions for Top Secret and either Canada or United States are required to be able to decrypt the object. That is, access is granted to decrypt if read permission (knowledge of private key) is available for any one credential that was used to encrypt in a MCSC, as well as read permission for a credential form any other category.

One solution is to encrypt the random value multiple times with multiple keys. In general, there is a key for each combination of credentials. Let $s_1$ be the number of credentials chosen for the first MCSC, $s_2$ for the second, and so on. Then, for n MCSC categories there are $m_L$ REKs, where $m_L$ is the product of all the $s_i$, that is, $$m_L = \Pi_{i=1}^{n} s_i$$

Each REK then would be the product of n shared values, that is, one shared value per category. This also implies that $m_L$ encryptions of the random value will be performed with $m_L$ different keys and $m_L$ times as much space will be required for the encrypted random value to be kept with the encrypted object in the header. This solution is called the lockbox method.

However, another solution based upon using a (2, $s_i$+1) threshold scheme will, in some cases, involve less data to store than the multiple REKs of the lockbox method. This method is called the threshold method. Using the Shamir Threshold Scheme, a threshold key is generated and $s_i$+1 threshold shares are created for MCSC i. The key set used can be any sufficiently large prime number. The domain-wide Diffie-Hellman parameter $p_c$, for example, can be used for the key set.

From the Diffie-Hellman shared value calculated for each credential within a MCSC, an AES key is calculated by binding as described above, using a counter of $00000001_{16}$ and the credential index as "other" information. These $s_i$ derived keys are used to encrypt $s_i$ of the threshold shares with AES. These are done in order, that is, the derived key corresponding to the lowest index credential is used to encrypt the second share. The first share remains plaintext.

The threshold key for each category is used like a shared value in the computation of the REK. The combiner method is again used, but with the threshold keys for the MCSC categories instead of Diffie-Hellman shared values and "other" information constructed from the number of credentials selected from each MCSC category.

Figure 4:
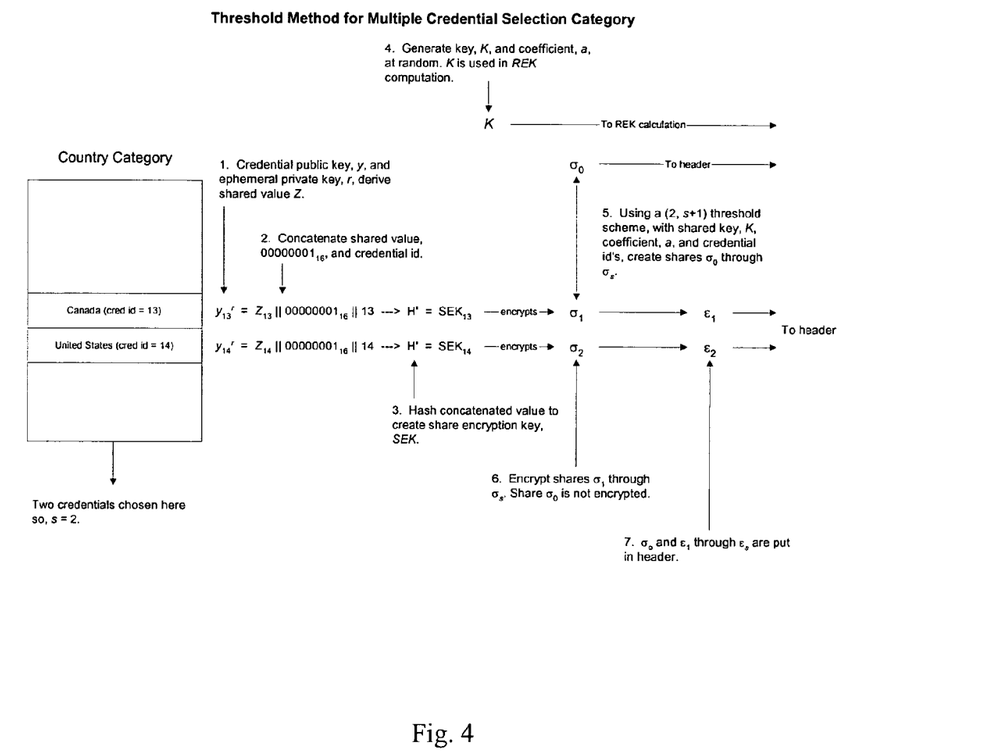
FIG. 4 is an illustration of the threshold method of implementing multiple credential selection categories.

FIG. 4 gives an overview of an exemplary threshold method of implementing multiple credential selection categories. The MCSC category is "Country" and two credentials have been selected, that is, "Canada" and "United States" which in this example have credential IDs of 13 and 14.

The information included with the encrypted object will include one encrypted random value, a plaintext threshold share per category, and a total of $\Sigma_{i=1}^{n} s_i$ encrypted threshold shares. If the number of items to be included with the encrypted object is denoted as $m_T$, then $$m_T = 1 + n + \Sigma_{i=1}^{n} s_i$$

If one category is used with multiple credentials, then the threshold scheme will produce two more items in the header, compared to the lockbox method. However, if more than one category has multiple credentials and more than three credentials are chosen within these categories, the threshold method will produce fewer items. The more credentials within each category that are chosen, the better the threshold scheme is, in terms of space resources, over the general product method.

Another method of implementing access-broadening credentials is to generate a 128-bit random value per category. These values are called $REK_i$, where the index i represents the category with which it is associated. The random value is only encrypted once with the REK. The REK is calculated as the exclusive-OR value of all the $REK_i$.

For each credential chosen within a category, the $REK_i$ is encrypted. The credential public key and ephemeral private key are used to derive a shared value as the basis of the encryption key. The key derivation function of the binder as discussed previously can be used to calculate the encryption keys.

The extra information to be included with the encrypted object is simply n 128-bit encrypted values, where the value n is just the total number of credentials chosen.

Details

SYMBOLS

| | |
|---|---|
| e(x, y) | AES encryption (in ECB mode) of x using y as the key. The values, x and y, are 128 bits. |
| e(x, y, z) | AES encryption (in CFB8 mode) of x using y as the key and z as the IV. All values are 128 bits. |
| d(x, y) | AES decryption (in ECB mode, 128 bit key) of x using y as the key. |
| d(x, y, z) | AES decryption (in CFB8 mode, 128 bit key and IV) of x using y as the key and z as the IV. |
| $\oplus$ | Exclusive-OR operation. |
| $\oplus_{i=1}^{n} x_i$ | Exclusive-OR all values of $x_i$ together from i = 1 to n. |
| $\|_{i \in S} x_i$ | Concatenate the $x_i$ values together for all i in the set S. |
| $H^y(x)$ | Cryptographic hash of x, applied y times |
| H'(x, n, o) | The combiner method of generating a key from shared value x using counters up to n and other information o. |
| $\kappa_\lambda$ | The key derived from I&A events specified for MLA level $\lambda$. |
| $\lambda_{max}$ | Represents the maximum MLA level. |
| $\lambda(c)$ | Represents the MLA level of credential c. |
| P | Represents data stored in a member's profile. |
| A | Represents the set of credentials available to a member at a given time. |
| S | Represents the set of credentials chosen by the member for encryption. |
| $c_{max}$ | The maximum number of credentials within a domain. Typically this is $2^8$ (256) or $2^{16}$ (65,536). |
| $p_c, q_c, g_c$ | Combiner Diffie-Hellman parameters. |
| $X_i$ | Private key associated with credential i. |
| $Y_i$ | Public key associated with credential i. |
| $Z_i$ | Computed shared value for credential i, (uses ephemeral keys). |
| r | Ephemeral private key. |
| t | Ephemeral public key. |
| $K_i$ | Threshold key for category i. |

Mathematical Description

Credentials Available

If MLA is not used, the set of credentials available to a member are all credentials that appear in the member's profile, that is, $\forall c \in P$.

In general, a credential is represented by an 5-tuple, (cid, $d_c$, $x_c$, $y_c$, $\lambda_c$), where cid is the credential index, $d_c$ is the category, $x_c$ is the private key for the credential, $y_c$ is the public key for the credential and $\lambda_c$ is the MLA level defined for the credential by the domain authority. Note that within a profile, the private key can be missing for some credentials. This implies encrypt-only (or write-only) permission for that credential.

Credentials that are in categories that are exempt from MLA (as determined by the domain authority) are always available. This set of credentials is $$\{\forall c \in P | \lambda_c = 0\} \tag{1}$$

The table shown in FIG. 5 summarizes the set of credentials that are available to a member who has logged in using an MLA level of $\lambda_{IA}$. The access type corresponds to the combinations from the table in FIG. 1.

The set described in eq. (1) in union with the one of the sets above (which depends upon domain policy) will be represented as $\forall c \in A$, where A is the set of available credentials per login.

Encryption of Member's Profile

Encryption of Profile Data Excluding Credentials

The profile is encrypted with a profile encryption key, PEK and an initialization vector, PIV. The PIV is stored in the profile in plaintext form. The PEK is encrypted $\lambda_{max}$ times, where $\lambda_{max}$ is the number of MLA levels used. The term $ePEK_\lambda$ represents the encrypted value of the PEK for MLA level $\lambda$ as stored in the profile, $$ePEK_\lambda = e(PEK, \kappa_\lambda, PIV) \tag{2}$$

where $\kappa_\lambda$ is the key derived from all I&A events that are defined for MLA level $\lambda$.

For decryption, a member completes a successful login at MLA level $\lambda$, regenerating the key $\kappa_\lambda$, and then recovering the PEK from $ePEK_\lambda$, which will allow decryption of the rest of the profile.

$$PEK = d(ePEK_\lambda, \kappa_\lambda, PIV) \tag{3}$$

Encrypting Credentials in the Member's Profile

Public and private keys are encrypted in the profile. The 5-tuple corresponding to credential c is stored in the profile as (cid, $d_c$, $ex_c$, $ey_c$, $\lambda_c$), where $$ex_c = e(x_c, xek_c, XIV_c) \tag{4a}$$

$$ey_c = e(y_c, yek_c, YIV_c) \tag{4b}$$

are the encrypted credential private and public keys. The $xek_c$ and $yek_c$ are credential private and public key encrypting keys, and $XIV_c$ and $YIV_c$ are private key and public key initialization vectors, respectively.

MLA Exempt Credentials

If the credential is exempt from MLA, then the credential encrypting keys and initialization vector are the same as the profile encrypting key and IV.

$\forall c \in P\ni. \lambda_c=0$ $$xek_c=yek_c=PEK \tag{5a}$$

$$XIV_c=YIV_c=PIV \tag{5b}$$

MLA Subject Credentials

There will be $\lambda_{max}$ initialization vectors corresponding to each MLA level and represented as $PIV_\lambda$.

$\forall c \in P\ni. \lambda_c \neq 0$, and $\forall \lambda \ni. 1 \leq \lambda \leq \lambda_{max}$, $$XIV_c=YIV_c=PIV_{\lambda c} \tag{6}$$

Each $PIV_\lambda$ is stored as plaintext in the profile.

Partitioned Access

For credential read or write partitioned access, the encrypting key is just the value derived from the I&A process. For read partitioned access, $$xek_c=\kappa_{\lambda c} \tag{7a}$$

For write partitioned access, $$yek_c=\kappa_{\lambda c} \tag{7b}$$

Access Up and Down

There will be $\lambda_{max}$ credential private key encryption keys, and $\lambda_{max}$ credential public key encrypting keys. These keys are represented by $xek_\lambda$, and $yek_\lambda$ respectively, where $\lambda$ corresponds to an MLA level. Each $xek_\lambda$ and $yek_\lambda$ are stored encrypted in the profile using the value derived from the I&A process for the respective level as the key.

For $1 \leq \lambda \leq \lambda_{max}$ $$exek_\lambda=e(xek_\lambda, \kappa_\lambda, PIV) \tag{8a}$$

$$eyek_\lambda=e(yek_\lambda, \kappa_\lambda, PIV) \tag{8b}$$

and to recover the $xek_\lambda$ and $yek_\lambda$ $$xek_\lambda=d(exek_\lambda, \kappa_\lambda, PIV) \tag{9a}$$

$$yek_\lambda=d(eyek_\lambda, \kappa_\lambda, PIV) \tag{9b}$$

For read-up or down access, the credential private key encryption keys are $$xek_c=xek_{\lambda c} \tag{10a}$$

For write-up or down access, the credential public key encryption keys are $$yek_c=yek_{\lambda c} \tag{10b}$$

For access up, an encrypting key for I&A level 1 is generated at random. All access up type encryption keys are derived from this value. The encrypting keys for I&A level other than the one used for I&A can then be derived from the encrypting key for level $\lambda_{IA}$.

For read-up $$xek_c=(H^{(\lambda_c-\lambda_{IA})}xek_{\lambda_{IA}})/2^{(h-k)} \tag{11a}$$

For write-up $$yek_c=(H^{(\lambda_c-\lambda_{IA})}yek_{\lambda_{IA}})/2^{(h-k)} \tag{11b}$$

where h is the output size of the hash function and k is the keysize of the credential encryption algorithm, in bits. The meaning of division by $2^{(h-k)}$ is that the derived key value is taken as the most significant k bits of the hashed value. For two-key triple DES and the SHA1 hash function (h–k) is 48.

For AES (128-bit key) and SHA256 (256-bit output) this value is 128. For AES (256-bit key) and SHA256 (256-bit output) this value is 0.

Note that for read-up or write-up credentials, if $\lambda_{IA}>\lambda_c$, access to the credential c read or write value is denied.

For access down, an encrypting key for I&A level $\lambda_{max}$ is generated at random. The encrypting keys for I&A level other than $\lambda_{max}$ are derived from the encrypting key for level $\lambda_{max}$. All access down type encryption keys are derived from this value. The encrypting keys for I&A level other than the one used for I&A can then be derived from the encrypting key for level $\lambda_{IA}$.

For read-up $$xek_c=(H^{(\lambda_{IA}-\lambda_c)}(xek_{\lambda_{IA}}))/2^{(h-k)} \tag{12a}$$

For write-up $$yek_c=H^{(\lambda_{IA}-\lambda_c)}(yek_{\lambda_{IA}})/2^{(h-k)} \tag{12b}$$

For read-down or write-down credentials, if $\lambda_c>\lambda_{IA}$, access to the credential c read or write value is denied.

Figure 6:
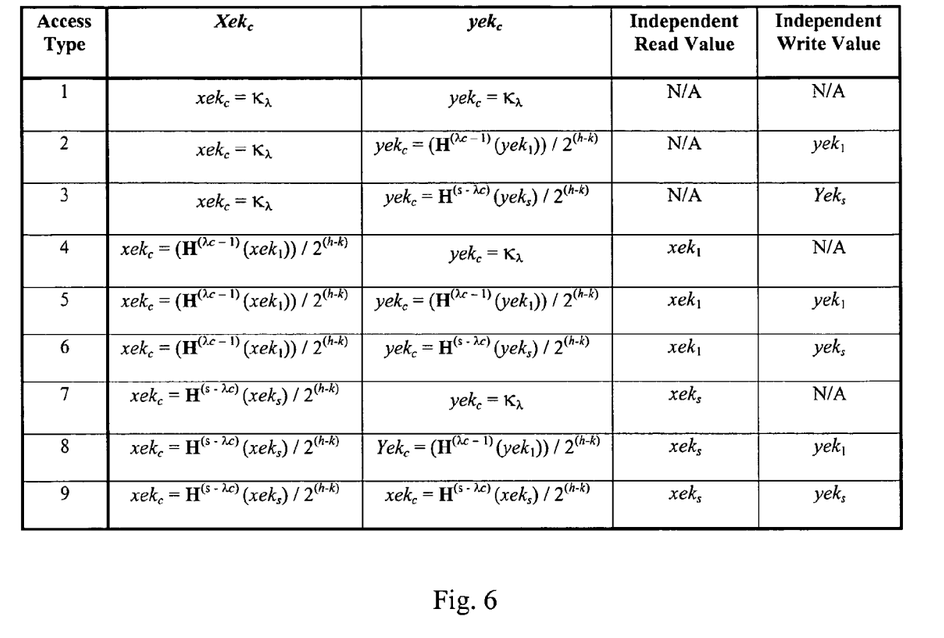
FIG. 6 is a table showing exemplary respective relationships between credential private key encryption keys and between credential public key encryption keys.

The table shown in FIG. 6 summarizes, for each access type as defined in the table of FIG. 1, the credential encryption keys and the independent values from which these are derived.

Figure 7:
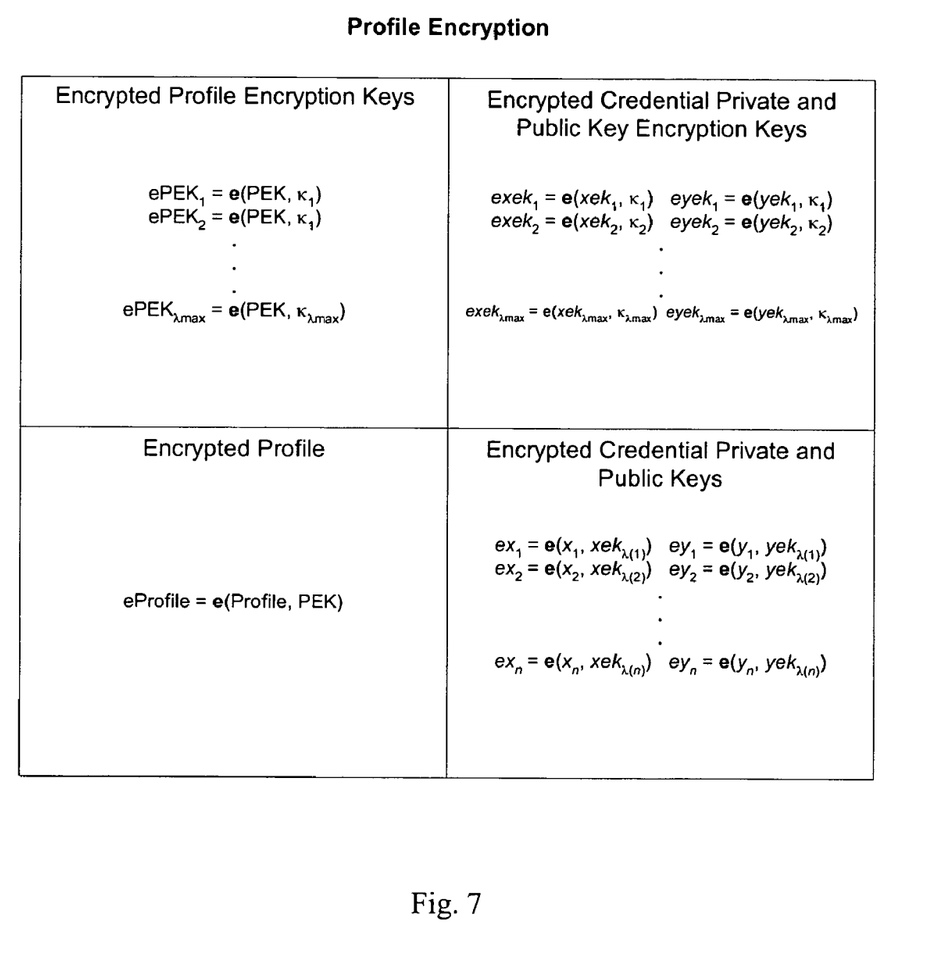
FIG. 7 is a table showing an exemplary encrypted member profile and keys according to the present invention.

FIG. 7 shows encrypted parts of the member profile. Credential public and private keys are encrypted with credential public and private key encryption keys of the same MLA level as the credential. Public and private key encryption keys are encrypted with the I&A derived key of the same level. The rest of the encrypted profile is encrypted with the PEK. The PEK is encrypted once for each MLA level using the I&A derived key of each level.

Figure 8:
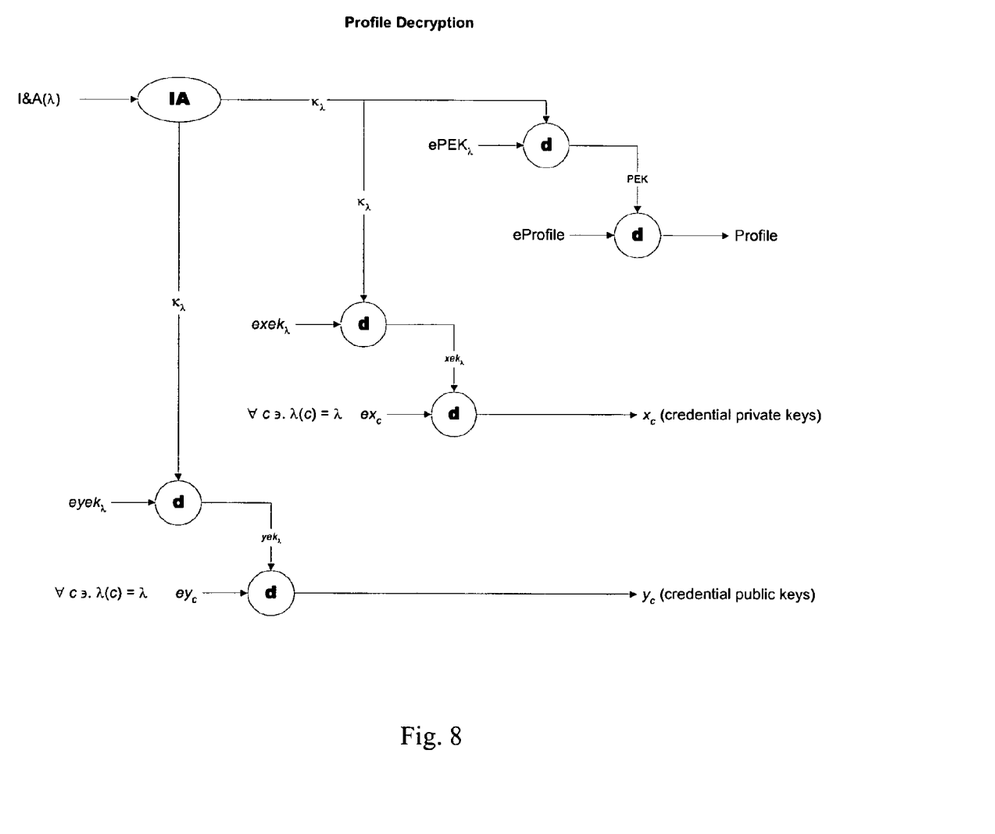
FIG. 8 is a block diagram showing steps in decrypting a member profile.

FIG. 8 shows the process of decrypting the profile. The member logs on using an I&A process that corresponds to MLA level 1. This level can be chosen by the member before logging in, can be dictated by the MLA level of an encrypted object, or can be specified for an application by the domain authority. A key is derived from the I&A events. This key decrypts the $ePEK_\lambda$ to recover the PEK, $exek_\lambda$ to recover $xek_\lambda$ and $eyek_\lambda$ to recover $yek_\lambda$. The profile is then decrypted with the PEK, credential private keys of MLA level $\lambda$ are decrypted with $xek_\lambda$, and credential public keys of MLA level $\lambda$ are decrypted with $yek_\lambda$.

Maintenance of Profile Keys

Periodically, cryptographic keys should be change. This applies to the I&A derived keys, profile encryption keys, and the credential public and private key encryption keys. Strategies to deal with key changes are discussed below.

I&A Derived Keys

An I&A event at one level is independent of I&A at other levels. Therefore, $\kappa_i$ can be changed easily without affecting any other $\kappa_j$ where $i \neq j$. Simply decrypt the encrypted credential private and public key encryption keys, namely, $exek_\lambda$ and $eyek_\lambda$, with the old $\kappa_\lambda$ to recover xek and yek. Then generate a new $\kappa_\lambda$ and re-encrypt with this key to generate the new $exek_\lambda$ and $eyek_\lambda$.

Profile Encryption Key and Initialization Vector

The profile must first be decrypted, then a new PEK and PIV generated at random, and finally re-encryption of the profile with the new key and IV takes place. Then the new PEK must be re-encrypted with $\kappa_\lambda$, for each $\lambda$. However, only one $\kappa_\lambda$ is known during the session in which the PEK is being changed.

To allow decryption of the PEK during the next session, which can be of a different I&A level, the new PEK is encrypted with the old PEK for each I&A level. This value is called ePEK'. After opening a session with a new I&A level, the encrypted PEK for the new I&A level can be calculated and stored. To simplify the process, a new PEK should not be generated until the previous PEK has been re-encrypted under all I&A levels. This leads to the following procedures.

Initial Change of PEK During a Session of I&A Level $\lambda$:

First, open a session with I&A level $\lambda$. Next, check to see if the old encrypted PEK, ePEK', is zero. If it is zero, then a new PEK can be generated. If it is not zero, then stop the PEK update process and go to the next action. Generate a new PEK and re-encrypt the entire profile with this new PEK. If the new randomly-generated PEK is zero, then choose a new PEK. Next, encrypt the old PEK under the new PEK and replace ePEK' with this value. Encrypt the PEK with $\kappa_\lambda$ as the key and replace the old ePEK$_\lambda$ with this new value. Then, initialize a Boolean change table (the PEK change table) to all zeros. Each entry in the PEK change table represents one I&A level. Next, set the value in the PEK change table of the entry corresponding to I&A level $\lambda$.

Subsequent Sessions of I&A Level i where i≠$\lambda$:

First, open a session with I&A level i. Next, check the entry corresponding to I&A level i in PEK change table. If this entry is set, then check all entries to see if they are set. If all entries are set, then erase the old encrypted PEK, that is, set ePEK' to zero and continue as normal. If the entry is not set, then continue with the next action. Decrypt ePEK$_i$ with key $\kappa_i$ to recover the old PEK, and decrypt ePEK' with the old PEK as the key to recover the new PEK. Next, encrypt the PEK with $\kappa_i$ as the key and replace the old ePEKi with this new value. Then, set the value in the PEK change table of the entry corresponding to I&A level i.

Credential Public and Private Key Encryption Keys

Changing a credential key encryption key is more involved. Depending on access type, credential key encryption keys can have dependences on each other for different I&A levels. Therefore, it might not be possible to change just one credential key encryption key; the sequence of credential key encryption keys for all I&A levels might have to be changed all at once. However, if credential keys, either public or private, are partitioned or exempt from MLA, then one can proceed as above for the PEK.

For access down, only credential key encryption keys below the current I&A level can be accessed. Therefore, the session must be in the highest I&A level to allow changing of these credential key encryption keys. Similarly, for access up, the session must be in the lowest I&A level to change this type of credential key encryption keys.

Because only one $\kappa_\lambda$ is known during a session, knowing just the credential key encryption keys for all I&A levels will not suffice. A strategy similar to changing the PEK is needed. This is done by using the old credential key encryption key of the same I&A level to encrypt the new credential key encryption key. Since there are both private and public credential keys, two lists of old credential key encryption keys must be kept. If a zero is used in the list for a key corresponding to an I&A level that has already been changed, then a separate Boolean list such as the one above for the PEK change table does not have to be maintained.

In the following exemplary procedures, only one old credential key encryption key list is mentioned. This list represents either the public or private credential key encryption key lists or both. The term CEK$_\lambda$ represents any credential key encryption key—either public or private—of I&A level $\lambda$.

Initial Change of the Credential Key Encryption Key During a Session of I&A Level $\lambda$, where $\lambda$ is Either 1 for Access Up, or $\lambda_{max}$ for Access Down:

First, open a session with I&A level $\lambda$. $\lambda$ must be 1 for access up or $\lambda_{max}$ for access down. If not, then stop the CEK update process. Next, check to see if the old encrypted CEK for all I&A levels is zero. If they are zero, then the CEK can be updated. If the list is not zero, then stop the CEK update process. Next, generate a new CEK$_\lambda$ and generate CEK for all of the other I&A levels according to eqs. (11). Also, generate the old CEKs for all of the I&A levels. The old CEKs will be used later in the procedure. Then, re-encrypt the new CEK$_\lambda$ with $\kappa$ as the key, and update this value in the profile. Also update the encrypted credential keys for level $\lambda$ by decrypting them with the old CEK and re-encrypting them with the new CEK. Then, store value zero in the old CEK list at the entry corresponding to I&A level $\lambda$. Then, for every i=2 through $\lambda_{max}$ (for access up), or for every i=$\lambda_{max}$-1 through 1 (for access down), encrypt the new CEKi with the old CEKi as the key, and copy the previous value to the old CEK list at the entry corresponding to I&A level i.

Subsequent Sessions of I&A Level i where i≠$\lambda$, where $\lambda$ is Either 1 for Access Up, or $\lambda_{max}$ for Access Down:

First, open a session with I&A level i. Next, decrypt eCEKi with $\kappa_\lambda$ as the key to recover CEKi. Then, check the entry corresponding to I&A level i in the old CEK list. That is, if the entry in the list is zero, then the CEKi from the previous step is the new CEKi. In this case, break from this procedure and continue normal processing. On the other hand, if the entry is not zero, then the CEKi from the previous step is the old CEKi. In this case, decrypt the entry with the old CEKi as the key to recover the new CEKi. Then store zero in the old CEK list at the entry corresponding to I&A level i. Next, encrypt the new CEKi with $\kappa_\lambda$ as the key and update the old CEKi value. Then decrypt all of the credential keys of I&A level i with the old CEKi, re-encrypt them with the new CEKi, and update the old value.

Computing a Random Value Encryption Key

Computing Shared Values

From the set of available credentials, A, the set of chosen credentials will be represented by S⊆A. A Diffie-Hellman ephemeral key pair is generated during object encryption. The shared value for each credential is then computed. For encryption, the $Z_i$ are calculated from credential public keys and the ephemeral private key, $$\forall i \in S \ Z_i = Y_i' \bmod p_c \quad (13a)$$

For decryption, the $Z_i$ are calculated from credential private keys and the ephemeral public key, $$\forall i \in S \ Z_i = t^{x_i} \bmod p_c \quad (13b)$$

Computing the REK Using One Credential Per Category

Using one credential per category, the REK is calculated by $$REK = H'(T, 00000001_{16}, o) \quad (14)$$

where T is $$T = \|_{i \in S} Z_i \quad (15)$$

and the concatenation is performed in order of increasing i. The other information, o, is $$o = \|_{i \in S} cid_i \quad (16)$$

where (similar to above) the concatenation is performed in order of increasing c.

Computing the REK Using More Than One Credential Per Category

Using more than one credential per category will result in several pieces of information to be sent or kept with the encrypted object in the header. The threshold method is described here for illustrative purposes; the lockbox method is not described in detail, but can be used instead. See FIG. 4 and the related description for an overview of the threshold method.

For each MCSC, represented as d, a shared key, $K_d < p_c$ and a coefficient, $a_d < p_c - 1$, are generated at random. Let the number of credentials chosen in category d be $s_d$. A total of $s_d + 1$ values will be generated and these values will be denoted as $x_{jd}$, where $0 \leq j \leq s_d$. The values are generated as follows:

$x_{0d} = c_{max} + 1$. The value $c_{max}$ is the maximum number of credentials that are possible in the system.

$x_{1d}$ = the credential ID of the credential in category d with the lowest credential index.

$x_{2d}$ = the credential ID of the credential in category d with the second-lowest credential index.

$x_{jd}$ = the credential ID of the credential in category d with the $j^{th}$ lowest credential index.

Next, $s_d + 1$ shares, called $\sigma_{jd}$, where $0 \leq j \leq s_d$, are calculated:

$$0 \leq j \leq s_d \quad \sigma_{jd} = (K_d + a_d x_{jd}) \bmod p_c \quad (17)$$

The share encrypting keys, $SEK_j$, are computed from the shared values, $Z_i$:

$$1 \leq j \leq s_d \quad SEK_j = H'(Z_i, 00000001_{16}, i) \quad (18)$$

where the i is the index of the credential that corresponds to the $j^{th}$ chosen credential in the category.

The shares are then encrypted using the SEKs and are put in the header. Let $\epsilon_j$ represent the encrypted share, then $$1 \leq j \leq s_d \quad \epsilon_j = e(\sigma_{jd}, SEK_j) \quad (19)$$

The first share, $\sigma_{0d}$, does not get encrypted; it appears in the header as plaintext.

The REK is calculated by $$REK = H'(T, 00000001_{16}, o) \quad (20)$$

where T is $$T = \|_{d \in S} K_d \quad (21)$$

and the concatenation is performed in order of increasing d. The other information, o, is formed by $$o = \|_{d \in S} d \quad (22)$$

where (similar to above) the concatenation is performed in order of increasing d.

In a mixed situation, where some categories have multiple credentials selected and some have only one, the T value is formed from a mix of $K_d$ and $Z_i$ (in increasing order of category).

For decryption, the Diffie-Hellman shared values are first calculated. For multiple credentials in a category, only the first one that the member has read access for is needed. If the member has read access to none of the credentials used in an MCSC, then access to the encrypted object is denied.

Shared values are calculated from the private part of the credential key pairs and the public part of the ephemeral key pair, according to eq. (13b). Then the share encryption keys are calculated from the Diffie-Hellman shared values, according to eq. (18). The SEKs can then be used to decrypt the threshold shares:

$$1 \leq j \leq s_d \quad \sigma_{jd} = d(\epsilon_j, SEK_j) \quad (23)$$

The first threshold share, $\sigma_{0d}$, for a category is taken from the header, because it is plaintext. With the first threshold share and any other (decrypted) share within category d, the shared key, $K_d$, can be calculated.

$$1 \leq j \leq S_d \quad K_d = \sigma 0d - x_{0d} (\sigma_{0d} - \sigma_{jd}) / (x_{0d} - x_{jd}) \bmod p_c \quad (24)$$

When all of the shared keys have been recovered, the REK is calculated according to eqs. (20) through (22), and the random component is then recovered. Once the random component is recovered, the working key can be reconstructed and the encrypted object can be decrypted.

The One Random Value per Category Method

For each MCSC, represented as i, 128 random bits are generated. These values will be referred to as $REK_i$. The random value encryption key, REK, is computed as the exclusive-OR result of all of the $REK_i$ $$REK = \oplus_1^d REK_i \quad (25)$$

Each $REK_i$ is encrypted with AES for each credential in the ith category before being transmitted with the encrypted object. The encrypted $REK_i$ for credential j is denoted $EREK_{ji}$, therefore, $$EREK_{ji} = e(REK_i, K_{ji}) \quad (26)$$

where $K_{ji}$ is the key associated with the jth chosen credential in category i. The $K_{ji}$ are computed by using the combiner key derivation function described previously, $$K_{ji} = H'(Z_{ji}, 00000001_{16}, j) \quad (27)$$

where $Z_{ji}$ is the Diffie-Hellman shared value corresponding to the jth credential in category i. These shared values are computed from the credential public keys, $Y_{ji}$, and the ephemeral private key, r:

$$\forall i \in S \in d \quad Z_{ji} = Y_j^r \bmod p_c \quad (28a)$$

For decryption, the shared values are calculated from the credential private keys, $X_{ji}$, and the ephemeral public key, t:

$$\forall i \in S \in d \quad Z_{ji} = t^{X_{ji}} \bmod p_c \quad (28b)$$

What is claimed is:

1. In a multi-level access system, a method of securing an object at a multiple-level access level, comprising:
   receiving, from a user, a profile key encryption key corresponding to the multiple-level access level;
   selecting an object to secure;
   selecting a profile associated with the user, wherein the profile includes
      a domain value,
      an encrypted profile encryption key, and
      a credential, wherein the credential includes
         an encrypted credential public key,
         an encrypted credential public key encryption key, and
         a multiple-level access identifier;
   selecting the credential based on a comparison of the multiple-level access level and the multiple-level access identifier;
   generating a working key, including
      generating a random value, and
      binding at least the domain value and the random value together to form the working key;
   encrypting the object with the working key;
   generating a random value encryption key, including
      decrypting the encrypted credential public key encryption key with at least the profile key encryption key, decrypting the encrypted credential public key with at least the decrypted credential public key encryption key, generating an ephemeral key pair including an ephemeral private key and an ephemeral public key, generating a shared value based on at least the ephemeral private key and the decrypted credential public key, and generating the random value encryption key based on at least the shared value;

encrypting the random value with at least the random value encryption key; and providing the encrypted object, the ephemeral public key, and the encrypted random value for an authorized recipient.

2. The method of claim 1, wherein the profile further includes a profile initialization vector, and decrypting the encrypted credential public key encryption key includes decrypting the encrypted credential public key encryption key with the profile key encryption key and the profile initialization vector.

3. The method of claim 2, wherein the credential further includes a credential initialization vector, and decrypting the encrypted credential public key includes decrypting the encrypted credential public key with the decrypted credential public key encryption key and the credential initialization vector.

4. The method of claim 3, wherein the multiple-level access level corresponds to the multiple-level access identifier.

5. The method of claim 3, wherein the multiple-level access level is identical to the multiple-level access identifier.

* * * * *